(12) United States Patent
Fuller et al.

(10) Patent No.: US 10,683,107 B2
(45) Date of Patent: Jun. 16, 2020

(54) RELEASE APPARATUS AND METHODS OF ASSEMBLING SAME

(71) Applicant: The Aerospace Corporation, El Segundo, CA (US)

(72) Inventors: Jerome K. Fuller, Lake Balboa, CA (US); Alexander August-Schmidt, Los Angeles, CA (US); Geoffrey A. Maul, Huntington Beach, CA (US); Cody L. Shaw, Green Cove Springs, FL (US)

(73) Assignee: The Aerospace Corporation, El Segundo, CA (US)

( * ) Notice: Subject to any disclaimer, the term of this patent is extended or adjusted under 35 U.S.C. 154(b) by 504 days.

(21) Appl. No.: 15/669,175

(22) Filed: Aug. 4, 2017

(65) Prior Publication Data

US 2019/0039758 A1  Feb. 7, 2019

(51) Int. Cl.
*B64G 1/22* (2006.01)
*B64G 1/66* (2006.01)
*F16B 1/00* (2006.01)
*H01Q 1/08* (2006.01)
*H01Q 1/12* (2006.01)
(Continued)

(52) U.S. Cl.
CPC ............ *B64G 1/222* (2013.01); *F16B 1/0014* (2013.01); *H01Q 1/08* (2013.01); *H01Q 1/288* (2013.01); *H01Q 15/161* (2013.01); *B64G 1/66* (2013.01); *H01Q 1/1235* (2013.01); *Y10T 403/593* (2015.01)

(58) Field of Classification Search
CPC ......... B64G 1/222; B64G 1/66; F16B 1/0014; F16B 2001/0098; F16C 11/10; H01Q 1/08; H01Q 1/1235; H01Q 1/288; H01Q 15/161; Y10T 403/21; Y10T 403/59; Y10T 403/591; Y10T 403/593; Y10T 403/597; Y10T 403/5986; Y10T 403/602; Y10T 403/608
USPC ... 403/28, 321, 322.1, 322.3, 324, 326, 327, 403/330
See application file for complete search history.

(56) References Cited

U.S. PATENT DOCUMENTS

4,561,614 A * 12/1985 Olikara ................. B64G 1/222
136/245
6,609,272 B1 * 8/2003 Lee ....................... E05D 11/082
16/307
(Continued)

*Primary Examiner* — Josh Skroupa
(74) *Attorney, Agent, or Firm* — Manita Rawat Duane Morris, LLP (57) ABSTRACT

A release apparatus includes a base member and a channel having a first portion and a second portion. A first rod positioned within the first portion includes a first end portion having a first coupling device and a second end portion coupled to a first portion of a panel assembly. A second rod positioned within the channel's second portion includes a first end portion having a second coupling device such that the second coupling device is positioned proximate to the first coupling device. The second rod includes a second end portion coupled to a second portion of the panel assembly. First and second coupling devices rotate such that a linear force is generated between the first and second rods, enabling the first rod second end portion and the second rod second end portion to simultaneously release the first and second portions of the panel assembly, respectively.

20 Claims, 9 Drawing Sheets

(51) Int. Cl.
*H01Q 1/28* (2006.01)
*H01Q 15/16* (2006.01)

(56) References Cited

U.S. PATENT DOCUMENTS

| | | | | |
|---|---|---|---|---|
| 6,768,582 | B1* | 7/2004 | Hachkowski | B64G 1/222 244/172.6 |
| 7,604,206 | B2* | 10/2009 | Jung | F16M 11/046 16/340 |
| 8,362,963 | B2* | 1/2013 | Rakotoarisoa | H01Q 19/192 343/757 |
| 9,104,381 | B2* | 8/2015 | Kuramochi | G06F 1/1681 |
| 10,348,349 | B2* | 7/2019 | Kondo | H04B 1/3833 |

* cited by examiner

RELEASE APPARATUS AND METHODS OF ASSEMBLING SAME

BACKGROUND

The invention relates generally to systems, such as spacecraft systems and satellite systems, and, more particularly, to a release apparatus that can be used with such systems.

At least some known systems, such as spacecraft systems and satellite systems, can use various types of actuators to release panel assemblies, arrays, probes, and other mechanisms and devices. At least some known actuators include pyro devices, "meltwires" or "burnwires", solenoids, motors, and shape memory alloy devices that can retain and then release a deployable component on command. In some instances, it is desired to release two opposing elements at the same time so that the releasing action does not impart unpredictable loads to the deployable elements.

At least some known systems can enable such simultaneous release of opposing elements by using separate electrical or electrochemical devices. However, using such separate devices can make it challenging to obtain simultaneous release, especially over a range of conditions and potential operating voltages.

BRIEF DESCRIPTION

The embodiments described herein provide a shape-memory alloy-triggered release apparatus that can facilitate the simultaneous release of deployable components in systems, such as spacecraft systems and satellite systems. For example, in some embodiments, a release apparatus includes a base member and a channel that is defined within at least a portion of the base member, wherein the channel has a first portion and a second portion that is adjacent to the first portion. A first rod is positioned within the first portion of the channel, wherein the first rod includes a first end portion that includes a first coupling device and a second end portion that is configured to couple to a first portion of a panel assembly. A second rod is positioned within the second portion of the channel, wherein the second rod includes a first end portion that includes a second coupling device such that the second coupling device is positioned proximate to the first coupling device. The second rod further includes a second end portion that is configured to couple to a second portion of the panel assembly, wherein each of the first coupling device and the second coupling device are configured to rotate such that a linear force is generated between the first rod and the second rod that enables the first rod second end portion and the second rod second end portion to simultaneously release the first portion and the second portion of the panel assembly when each of the first portion and the second portion of the panel assembly are coupled to the first rod second end portion and the second rod second end portion, respectively.

In other embodiments, a system, such as a satellite system, is provided and includes a deployable portion that includes a panel assembly having a first portion and a second portion. A main body portion is configured to couple to the deployable portion, wherein the main body portion includes a release apparatus that includes a base member and a channel that is defined within at least a portion of the base member. The channel includes a first portion and a second portion that is adjacent to the first portion. A first rod is positioned within the first portion of the channel, wherein the first rod includes a first end portion that includes a first coupling device and a second end portion that is configured to couple to the first portion of the panel assembly. A second rod is positioned within the second portion of the channel, wherein the second rod includes a first end portion that includes a second coupling device such that the second coupling device is positioned proximate to the first coupling device. The second rod further includes a second end portion that is configured to couple to the second portion of the panel assembly, wherein each of the first coupling device and the second coupling device are configured to rotate such that a linear force is generated between the first rod and the second rod that enables the first rod second end portion and the second rod second end portion to simultaneously release the first portion and the second portion of the panel assembly when each of the first portion and the second portion of the panel assembly are coupled to the first rod second end portion and the second rod second end portion, respectively.

In yet other embodiments, a method of assembling a release apparatus, wherein the method includes providing a base member and defining a channel within at least a portion of the base member, wherein the channel includes a first portion and a second portion that is adjacent to the first portion. A first rod is positioned within the first portion of the channel, wherein the first rod includes a first end portion that includes a first coupling device and a second end portion that is configured to couple to a first portion of a panel assembly. A second rod is positioned within the second portion of the channel, wherein the second rod includes a first end portion that includes a second coupling device such that the second coupling device is positioned proximate to the first coupling device. The second rod further includes a second end portion that is configured to couple to a second portion of the panel assembly. Each of the first coupling device and the second coupling device are configured to rotate such that a linear force is generated between the first rod and the second rod that enables the first rod second end portion and the second rod second end portion to simultaneously release the first portion and the second portion of the panel assembly when each of the first portion and the second portion of the panel assembly are coupled to the first rod second end portion and the second rod second end portion, respectively.

DETAILED DESCRIPTION

As described above, it can be advantageous to release two opposing elements simultaneously so that the releasing action does not impart unpredictable loads to the deployable elements. While simultaneous release of two opposing elements can occur by using separate electrical or electromechanical devices. Using separate devices can pose challenges, especially over a range of conditions and potential operating voltages.

The embodiments described herein provide a shape-memory alloy-triggered release apparatus that can facilitate the simultaneous release of deployable components in systems, such as spacecraft systems and satellite systems, wherein the release apparatus is a single mechanical bridging element. As described herein, the release apparatus can enable energy stored in springs to facilitate the releasing action. For example, in some embodiments, torsion springs can be loaded by rotating a center spool that includes a set of mirror image auger shapes that are threaded together by a screw or coupling device. The screw or coupling device can have differential threads so that a full turn of the screw only causes a small adjustment. Using such a differential screw, the process of drawing the auger elements together can be carefully controlled.

FIGS. 1A-1D each illustrate system 100. In some embodiments, system 100 can be a spacecraft or satellite system that is configured to facilitate communication in space. Although, exemplary embodiments illustrate a satellite system, the present disclosure is not limited to satellite systems and one of ordinary skill in the art will appreciate that the current disclosure may be used in connection with any type of system.

System 100 includes a deployable portion 102 having a panel assembly 104 that is coupled to a main body portion 106. In some embodiments, panel assembly 104 is a reflectorarray antenna assembly and main body portion includes a satellite, such as a CubeSat (ISARA), wherein assembly 104 is wrapped around main body portion 106. For example, panel assembly 104 can include a plurality of panels, such as panels 108, 110, and 112. While three panels 108, 110, and 112 are shown in FIGS. 1A-1D, panel assembly 104 can include any number of panels that enable panel assembly 104 and system 100 to function as described herein. In some embodiments, panel 108 can be coupled to panel 110 via a first set of coupling members 109a and 109b, and panel 112 can be coupled to panel 110 via a second set of coupling members 111a and 111b. In some embodiments, coupling members 109a, 109b, 111a, and 111b can be hinges that include, for example, screws and bolts. It should be noted that, as used herein, the term "couple" is not limited to a direct mechanical, thermal, communication, and/or an electrical connection between components, but may also include an indirect mechanical, thermal, communication and/or electrical connection between multiple components.

In some embodiments, when panel assembly 104 is wrapped around main body portion 106 (shown in FIG. 1A), panel 108 is positioned on and directly adjacent to a first side surface 114 of main body portion 106 such that first side surface is covered by panel 108 and is not visible. Panel 112 is positioned on and directly adjacent to a second side surface 116 of main body portion 106 such that second side surface 116 is covered by panel 112 and is not visible. Panel 110 is positioned on and directly adjacent to a top surface 118 of main body portion 106 such that top surface 118 is covered by panel 110 and is not visible. A bottom surface 120 of main body portion 106 remains uncovered.

Figure 1A:
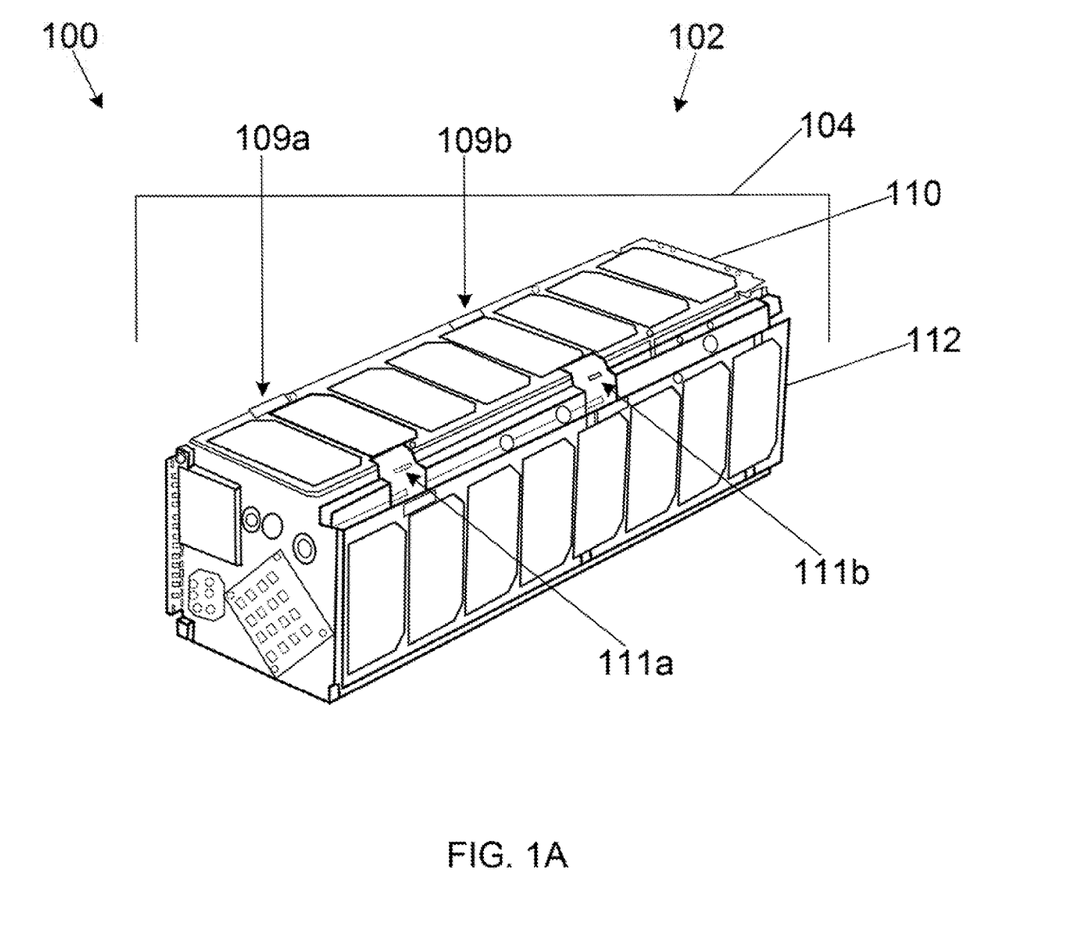
FIGS. 1A-1D are perspective views of an exemplary satellite system in accordance with some embodiments of the present disclosure.
Figure 1B:
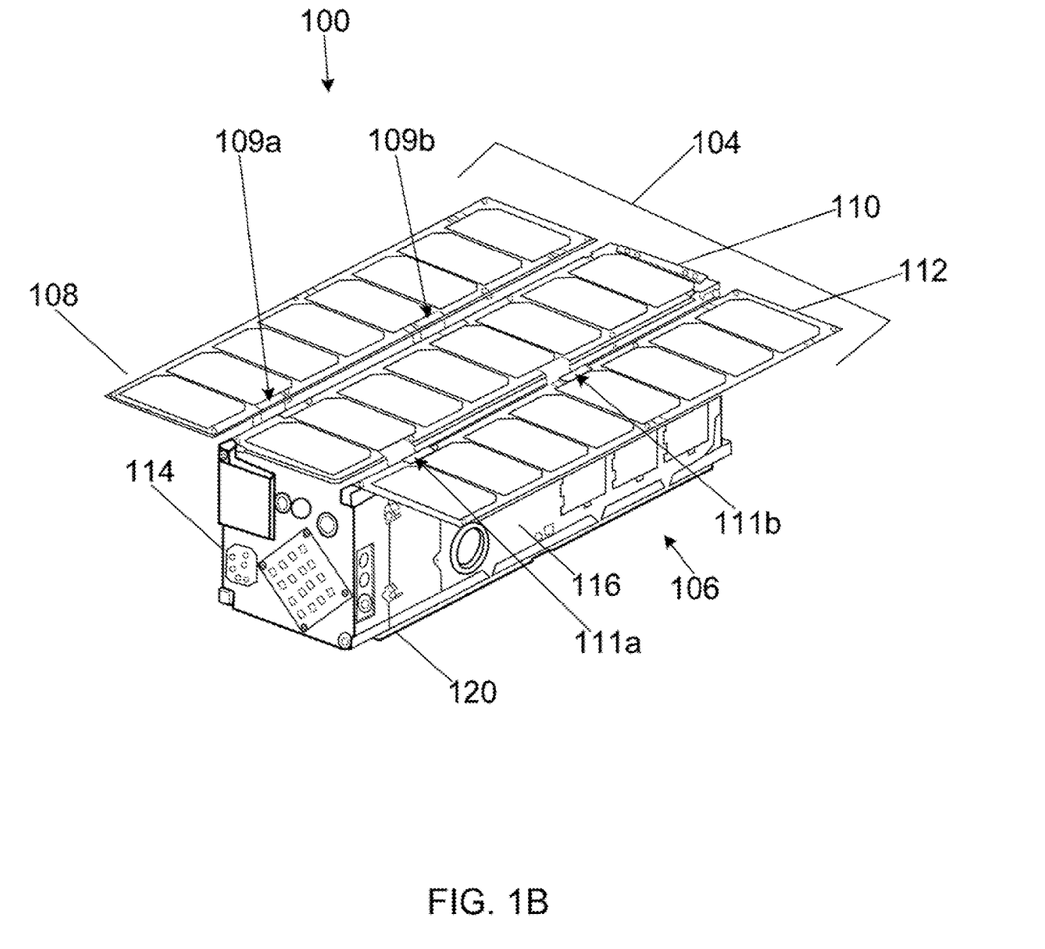
Figure 1C:
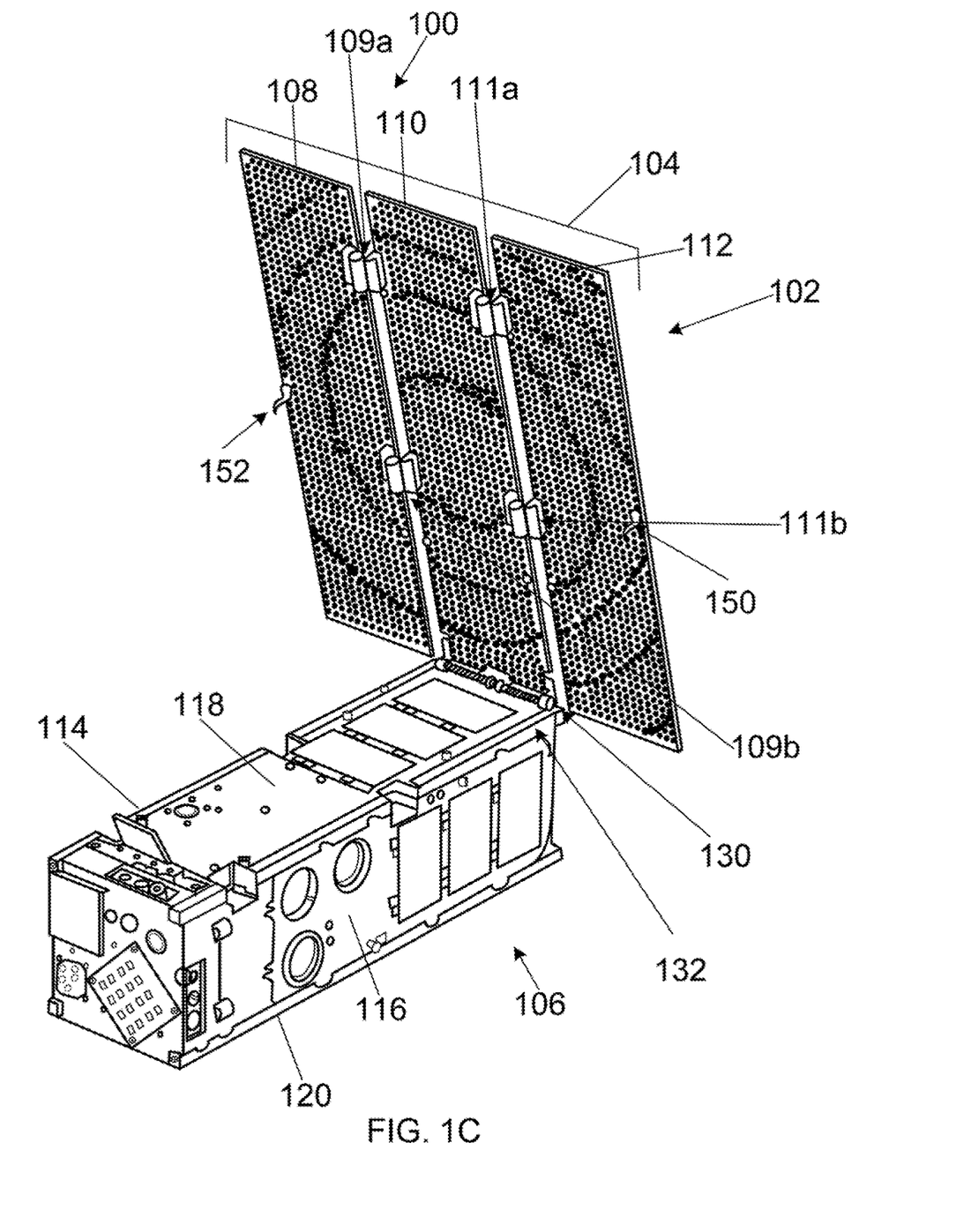
Figure 1D:
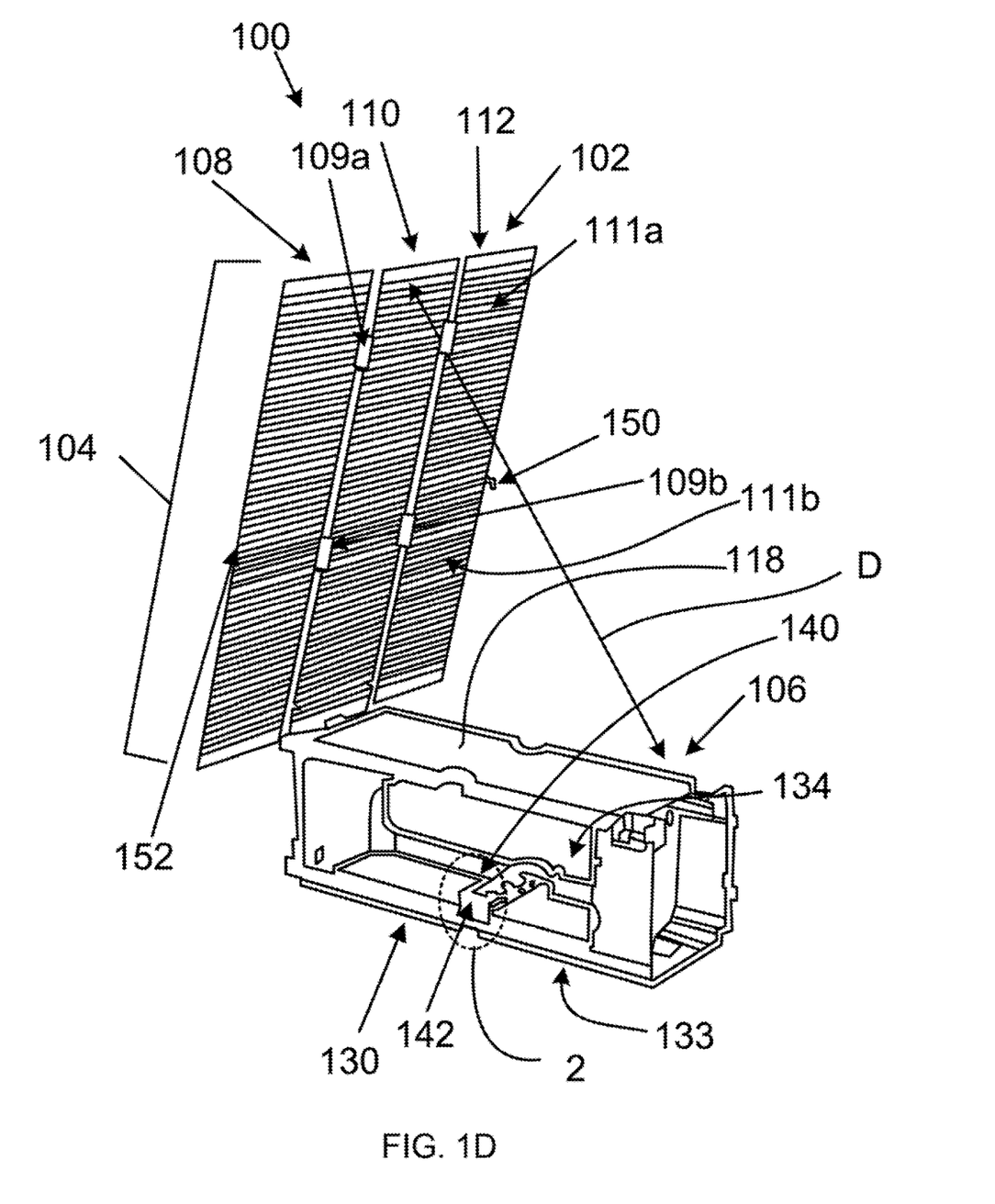

In some embodiments, a release apparatus 130 is positioned within main body portion 106 and is not visible, as release apparatus 130 is covered by surfaces 114, 116, 118, and 120. For example, as shown in FIG. 1D where surfaces 114, 116, 118, and 120 are not shown, main body portion 106 includes a first side column portion 133 and a second side column portion 134. Release apparatus 130 can be positioned within main body portion 106 such that a first end 140 of release apparatus 130 is fixedly coupled to second side column portion 134 and a second end 142 of release apparatus 130 is fixedly coupled to first side column portion 133. Moreover, as explained in more detail below with respect to the remaining figures, panel assembly 104 is coupled to main body portion 106 via release apparatus 130. For example, a first wing hook 150 on panel 112 can be coupled to first end 140 of release apparatus 130 and a second wing hook 152 on panel 108 can be coupled to second end 142 of release apparatus 130.

As described in more detail below with respect to the remaining figures, at least a portion of panel assembly 104 can be released from main body portion 106. For example, panel 108 can be released from first side surface 114 by having first wing hook 150 be released from first end 140 of release apparatus such that panel 108 is no longer positioned on first side surface 114 and first side surface 114 is visible, and panel 112 can be released from second side surface 116 by having second wing hook 152 be released from second end 142 of release apparatus such that panel 112 is no longer positioned on second side surface 116 and second side surface 116 is visible. As panels 108 and 112 are released and no longer positioned on respective side surfaces 114 and 116, panel 110 is lifted above top surface 118 such that panel 110 is no longer on top surface 118 and top surface 118 is visible (shown in FIGS. 1C and 1D). When panel assembly 104 is released from main body portion 106, panel assembly 104 is positioned a distance D from top surface 118 and only an end portion 130 of panel 110 is coupled to an end portion of 132 of top surface 118, while panels 108 and 112 are no longer coupled to main body portion 106 (as shown in FIGS. 1B-1D).

Figure 2:
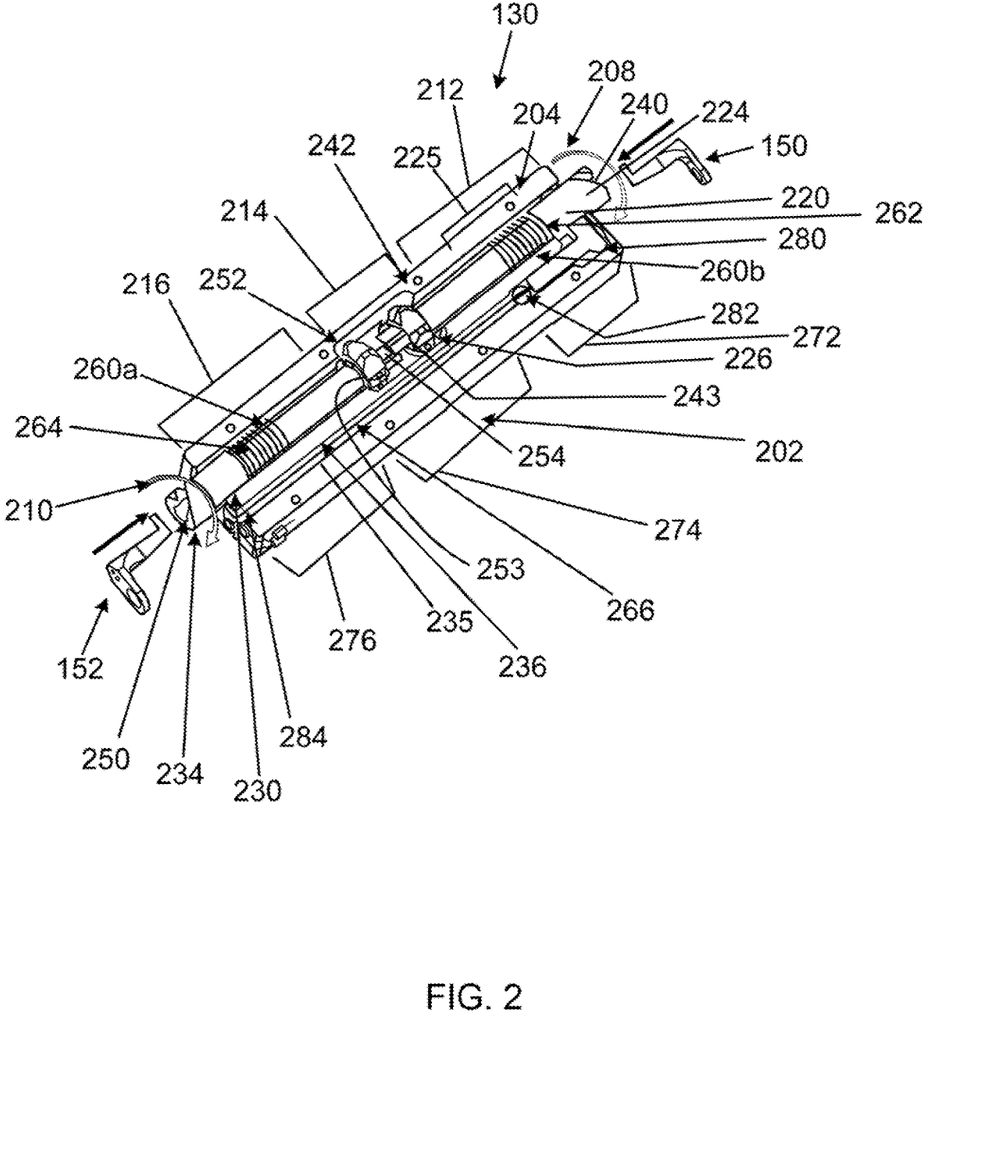
FIG. 2 is a perspective view of a diagram of an exemplary release apparatus that can be used with the satellite system shown in FIGS. 1A-1D and taken from area 2 in FIG. 1D, in accordance with some embodiments of the present disclosure.
Figure 3A:
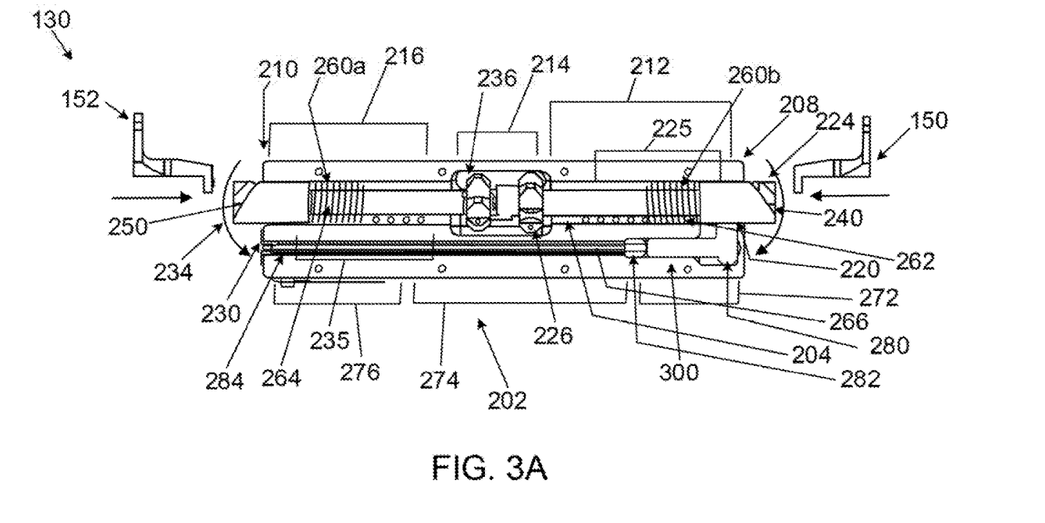
FIGS. 3A-3D are side views of diagrams of the release apparatus shown in FIG. 2 in accordance with some embodiments of the present disclosure.
Figure 3B:
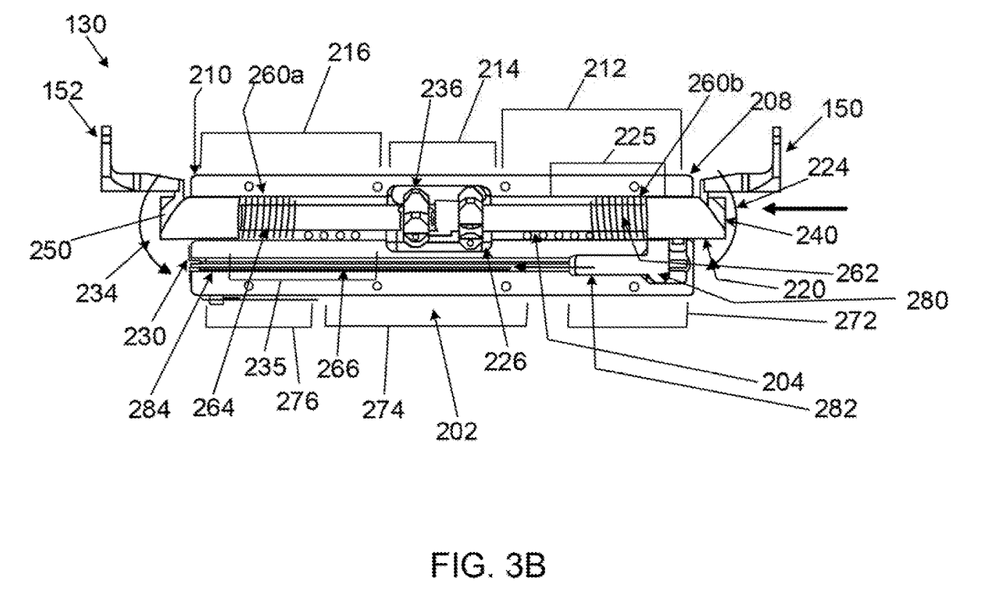
Figure 3C:
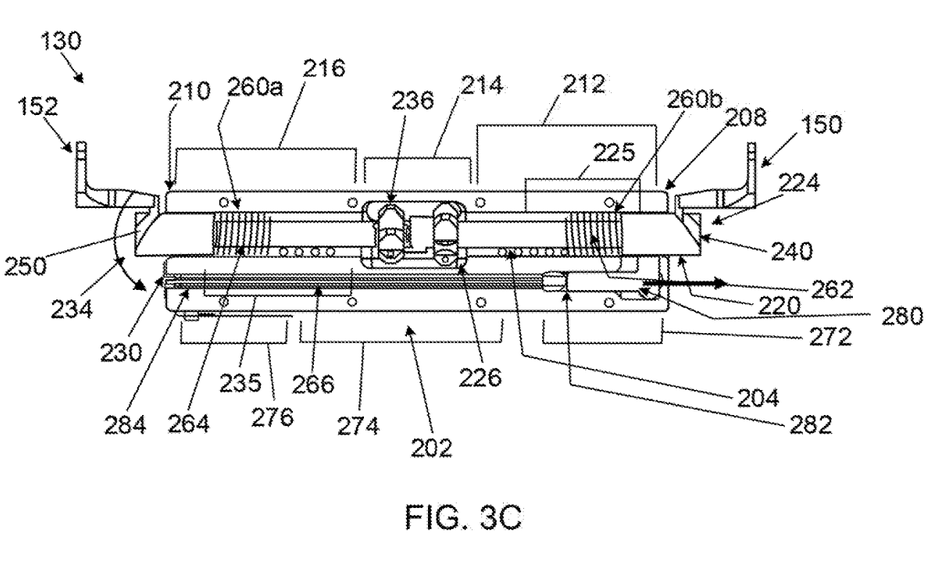
Figure 3D:
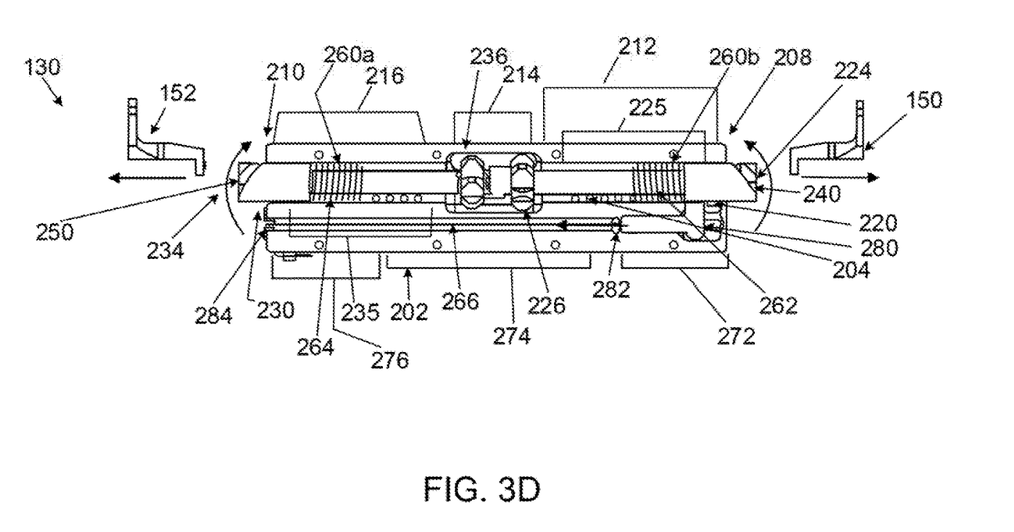

FIG. 2 illustrates a diagram of release apparatus 130 taken from area 2 (shown in FIG. 1D). FIGS. 3A-3D are additional diagrams of release apparatus 130. In some embodiments, release apparatus 130 includes a base member 202 with a channel 204 that is defined therein. For example, in some embodiments, channel 204 is defined in at least a portion of base member 202 such that channel 204 extends from a first end portion 208 of base member 202 and through a second end portion 210 of base member 202. In some embodiments, channel 204 has a first segment portion 212, a middle segment portion 214, and a second segment portion 216. In some embodiments, first segment portion 212 is configured to receive a first cylindrical rod 220 therein. For example, first cylindrical rod 220 can be positioned within first segment portion 212 such that first cylindrical rod 220 can rotate within first segment portion 212. As such, the diameter of rod 220 is less than the diameter of first segment portion 212 of channel 204. Moreover, rod 220 is positioned within channel 204 such that at least a portion of rod 220 is also positioned within middle segment portion 214. For example, rod 220 can have a first end portion 224, a middle portion 225, and a second end portion 226, wherein middle portion 225 is positioned within first segment portion 212 of channel 204 and second end portion 226 is positioned within middle segment portion 214 of channel.

Second segment portion 216, in some embodiments, is configured to receive a second cylindrical rod 230 therein. For example, second cylindrical rod 230 can be positioned within second segment portion 216 such that second cylindrical rod 230 can rotate within second segment portion 216. As such, the diameter of rod 230 is less than the diameter of second segment portion 216 of channel 204. Moreover, rod 230 is positioned within channel 204 such that at least a portion of rod 230 is also positioned within middle segment portion 214. For example, rod 230 can have a first end portion 234, a middle portion 235, and a second end portion 236, wherein middle portion 235 is positioned within second segment portion 216 of channel 204 and second end portion 236 is positioned within middle segment portion 214 of channel. In some embodiments, rod 220 can be threaded differently than rod 230. For example, rod 220 can have a 4-40 thread and the rod 230 can have a 4-48 thread, or vice versa.

In some embodiments, first rod 220 includes a first slit or opening 240 defined within first end portion 224 of rod 220 and extends through second end portion 226 of rod 220. First slit opening 240 can be configured to receive first wing hook 150 therein. A first coupling device 242 is on second end portion 226 of rod 220. First coupling device 242, for example, can be a ratchet wheel that is coupled to second end portion 226 of rod 220. For example, first coupling device 242 can have an opening 243 that is configured to receive second end portion 226 of rod 220 therein.

Similarly, second rod 230 includes a second slit or opening 250 defined within first end portion 234 of rod 230 and extends through second end portion 236 of rod 230. Second slit opening 250 can be configured to receive second wing hook 152 therein. A second coupling device 252 is on second end portion 236 of rod 230. Second coupling device 252 can also be a ratchet wheel that is coupled to second end portion 236 of rod 230. For example, second coupling device 252 can have an opening 253 that is configured to receive second end portion 236 of rod 230 therein. Each of first coupling device 242 and second coupling device 252 are configured to rotate.

In some embodiments, a differential screw 254 that is substantially cylindrical can be positioned between first rod 220 and second rod 230. For example, differential screw 254 can be coupled to first rod 220 and second rod 230, wherein opening 240 on second end portion 226 of rod 220 is configured to receive an end portion of differential screw 254 and opening 253 on second end portion 236 of rod 230 is configured to receive another end portion of differential screw 254.

In some embodiments, release apparatus 130 includes at least one torsion spring, such as torsion springs 260a and 260b. For example, first rod 220 can have an opening 262 defined within at least a portion of middle portion 225 of first rod 220 and torsion spring 260b can be positioned within opening 262. Similarly, second rod 230 can have an opening 264 defined within at least a portion of middle portion 235 of second rod 230.

Release apparatus 130 can also include a second channel 266 defined therein. Second channel 266 is defined in at least a portion of base member 202 and is positioned substantially parallel to channel 204. In some embodiments, second channel 266 extends from first end portion 208 of base member 202 and through a second end portion 210 of base member 202. In some embodiments, second channel 266 has a first segment portion 272, a middle segment portion 274, and a second segment portion 276. A device 280, such as a pawl, is positioned within first segment portion 272 and connected to a coupling device 282. In some embodiments, device 280 can be coupled to rod 220 via, for example, a slit or opening (not shown) on rod 220. When device 280 is coupled to rod 220, any rotational movement by rod 220 is inhibited. When device 280 is not coupled to rod 220, rotational movement by 220 can occur.

A metal wire component 284, such as a shape memory alloy ("SMA") wire that is configured to contract when heated (e.g., passing an electric current through it), is positioned within middle segment portion 274 and second segment portion 276. In some embodiments, metal wire component 284 is configured to receive an electrical charge. Moreover, metal wire component 284 can be coupled to device 280, via coupling device 282.

During operation, when panel assembly 104 (shown in FIGS. 1A-1D) is not released from main body portion 106 (shown in FIGS. 1A-1D), then device 282 is coupled to rod 220, and rod 220 and rod 230 are unable to rotate. Moreover, first wing hook 150 is securely coupled within opening 240 and second wind hook 152 is securely coupled within second slit opening 250. At least a portion of panel assembly 104 can be released from main body portion 106 using release apparatus 130. For example, an electrical charge from a charge source (not shown) is transmitted to and received by wire component 284. The electrical charge is channeled through wire component 284 and transmitted to device 280 via coupling device 282. Upon receiving the electrical charge, device 280 is decoupled from rod 220 and, thus, enabling rod 220 to rotate. Rod 220 can rotate based on the rotating force that is provided by, for example, torsion spring 260b. As rod 220 rotates, first coupling device 242 rotates causing second coupling device 252 to rotate. Moreover, differential screw 254 rotates, which causes rod 220 to slide away from rod 230. Rod 230 is enabled to rotate, at least in part, by the rotating force provided by, for example, torsion spring 260a. First coupling device 242 and second coupling device 252 cause first rod 220 and second rod 230 to rotate at the same time and to rotate in the same direction. As such, based on the foregoing, in some embodiments, metal wire component 284 can be energized and then can contract. As described in more detail below, when metal wire component 284 contracts, it can pull a blocking element, such as device 280, out of the way and enable the torsion springs 260a and 260b to cause the rods 220 and 230 to rotate.

Moreover, when first coupling device 242 and second coupling device 252 each rotate, a linear force is generated between first rod 220 and second rod 230. As rods 220 and 230 rotate and as first rod 220 moves away from rod 230, then first wing hook 150 decouples from opening 240 and, simultaneously, second wind hook 152 decouples from second slit opening 250. As such, panel 108 (shown in FIGS. 1A-1D can be released from first side surface 114 (shown in FIGS. 1A-1D) such that panel 108 (shown in FIGS. 1A-1D) is no longer positioned on first side surface 114 (shown in FIGS. 1A-1D) and first side surface 114 is visible, and panel 112 (shown in FIGS. 1A-1D) can be released from second side surface 116 (shown in FIGS. 1A-1D) such that panel 112 (shown in FIGS. 1A-1D) is no longer positioned on second side surface 116 (shown in FIGS. 1A-1D) and second side surface 116 is visible. As panels 108 and 112 are released and no longer positioned on respective side surfaces 114 and 116, panel 110 (shown in FIGS. 1A-1D) is lifted above top surface 118 (shown in FIGS. 1A-1D) such that panel 110 is no longer on top surface 118 and top surface 118 is visible (shown in FIGS. 1C and 1D). In some embodiments, release apparatus 130 is armed or cocked and the deployable wings, such as wing hooks 150 and 152 are stowed by rotating the rods 220 and 230 to trap the wing hooks 150 and 152, and to put, for example, a tip portion 300 of coupling device 282 below device 280. With rods 220 and 230 held in place, device 280 is moved over tip portion 300 of coupling device 282. As such, coupling device 282 is prohibited from rotating back. Play can be removed by turning differential screw 254, drawing the wing hooks 150 and 152 in. During release, wire component 284 is energized and heats up. Wire component 284 contracts and clears tip 300 of coupling device 282 and enables the torsion springs 260a and 260b to cause rods 220 and 230 to rotate back to the uncocked position. As rods 220 and 230 rotate, wing hooks 150 and 152 are forced away from the respective helical slots that once held them down.

Exemplary embodiments of the apparatus, systems, and methods are described above in detail. The apparatus, systems, and methods are not limited to the specific embodiments described herein, but rather, components of the apparatus, systems, and/or steps of the method may be utilized independently and separately from other components and/or steps described herein. For example, the apparatus may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A release apparatus comprising:
   a base member;
   a channel defined within at least a portion of said base member, wherein said channel comprises a first portion and a second portion that is adjacent to said first portion;
   a first rod positioned within said first portion of said channel, wherein said first rod comprises a first end portion comprising a first coupling device and a second end portion that is configured to couple to a first portion of a panel assembly; and
   a second rod positioned within said second portion of said channel, wherein said second rod comprises a first end portion comprising a second coupling device such that said second coupling device is positioned proximate to said first coupling device, said second rod further comprises a second end portion that is configured to couple to a second portion of the panel assembly, wherein each of said first coupling device and said second coupling device are configured to rotate such that a linear force is generated between said first rod and said second rod that enables said first rod second end portion and said second rod second end portion to simultaneously release the first portion and the second portion of the panel assembly when each of the first portion and the second portion of the panel assembly are coupled to said first rod second end portion and said second rod second end portion, respectively.

2. A release apparatus in accordance with claim 1, wherein each of said first rod second end portion and said second rod second end portion comprises a slit configured to receive the first portion and the second portion of the panel assembly, respectively, therein.

3. A release apparatus in accordance with claim 1, wherein said base member further comprises an additional channel defined therein.

4. A release apparatus in accordance with claim 3, further comprising:
   a wire component positioned within said additional channel, wherein said wire component is configured to receive an electrical charge; and
   a device positioned within said additional channel and coupled to said wire component such that said device is configured to receive the electrical charge from said wire component to enable said device to rotate said first rod.

5. A release apparatus in accordance with claim 1, wherein each of said first coupling device and said second coupling device are configured to rotate such that said first rod and said second rod rotate at the same time and rotate in the same direction.

6. A release apparatus in accordance with claim 1, wherein each of said first rod and said second rod comprises a middle portion comprising an opening defined therein.

7. A release apparatus in accordance with claim 6, further comprising a torsion spring positioned in said opening of each of said first rod and said second rod.

8. A system comprising:
   a deployable portion comprising a panel assembly comprising a first portion and a second portion; and
   a main body portion configured to couple to said deployable portion, said main body portion comprising a release apparatus comprising:
   a base member;
   a channel defined within at least a portion of said base member, wherein said channel comprises a first portion and a second portion that is adjacent to said first portion;
   a first rod positioned within said first portion of said channel, wherein said first rod comprises a first end portion comprising a first coupling device and a second end portion that is configured to couple to said first portion of said panel assembly; and
   a second rod positioned within said second portion of said channel, wherein said second rod comprises a first end portion comprising a second coupling device such that said second coupling device is positioned proximate to said first coupling device, said second rod further comprises a second end portion that is configured to couple to said second portion of said panel assembly, wherein each of said first coupling device and said second coupling device are configured to rotate such that a linear force is generated between said first rod and said second rod that enables said first rod second end portion and said second rod second end portion to simultaneously release said first portion and said second portion of said panel assembly when each of said first portion and said second portion of said panel assembly are coupled to said first rod second end portion and said second rod second end portion, respectively.

9. A system in accordance with claim 8, wherein each of said first rod second end portion and said second rod second end portion comprises a slit configured to receive said first portion and said second portion of said panel assembly, respectively, therein.

10. A system in accordance with claim 8, wherein said base member further comprises an additional channel defined therein.

11. A system in accordance with claim 10, wherein said release apparatus further comprises:
a wire component positioned within said additional channel, wherein said wire component is configured to receive an electrical charge; and
a device positioned within said additional channel and coupled to said wire component such that said device is configured to receive the electrical charge from said wire component to enable said device to rotate said first rod.

12. A system in accordance with claim 8, wherein each of said first coupling device and said second coupling device are configured to rotate such that said first rod and said second rod rotate at the same time and in the same direction.

13. A system in accordance with claim 8, wherein each of said first rod and said second rod comprises a middle portion comprising an opening defined therein.

14. A system in accordance with claim 13, further comprising a torsion spring positioned in said opening of each of said first rod and said second rod.

15. A method of assembling a release apparatus, said method comprising:
providing a base member;
defining a channel within at least a portion of the base member, wherein the channel includes a first portion and a second portion that is adjacent to the first portion;
positioning a first rod within the first portion of the channel, wherein the first rod includes a first end portion that includes a first coupling device and a second end portion that is configured to couple to a first portion of a panel assembly;
positioning a second rod within the second portion of the channel, wherein the second rod includes a first end portion that includes a second coupling device such that the second coupling device is positioned proximate to the first coupling device, the second rod further includes a second end portion that is configured to couple to a second portion of the panel assembly; and
configuring each of the first coupling device and the second coupling device to rotate such that a linear force is generated between the first rod and the second rod that enables the first rod second end portion and the second rod second end portion to simultaneously release the first portion and the second portion of the panel assembly when each of the first portion and the second portion of the panel assembly are coupled to the first rod second end portion and the second rod second end portion, respectively.

16. A method in accordance with claim 15, further comprising configuring each of the first rod second end portion and the second rod second end portion to include a slit that is enabled to receive the first portion and the second portion of the panel assembly, respectively, therein.

17. A method in accordance with claim 15, furthering comprising configuring an additional channel to be defined within the base member.

18. A method in accordance with claim 17, further comprising:
positioning a wire component within the additional channel;
configuring the wire component to receive an electrical charge;
positioning a device within the additional channel such that the device is coupled to the wire component; and
configuring the device to receive the electrical charge from the wire component to enable the device to rotate the first rod.

19. A method in accordance with claim 15, further comprising configuring the first coupling device and the second coupling device such that the first rod and the second rod to rotate at the same time and rotate in the same direction.

20. A release apparatus in accordance with claim 19, further comprising:
defining an opening in each of the first rod and the second rod; and
positioning a torsion spring in the opening of each of the first rod and the second rod.

* * * * *